UNITED STATES PATENT OFFICE.

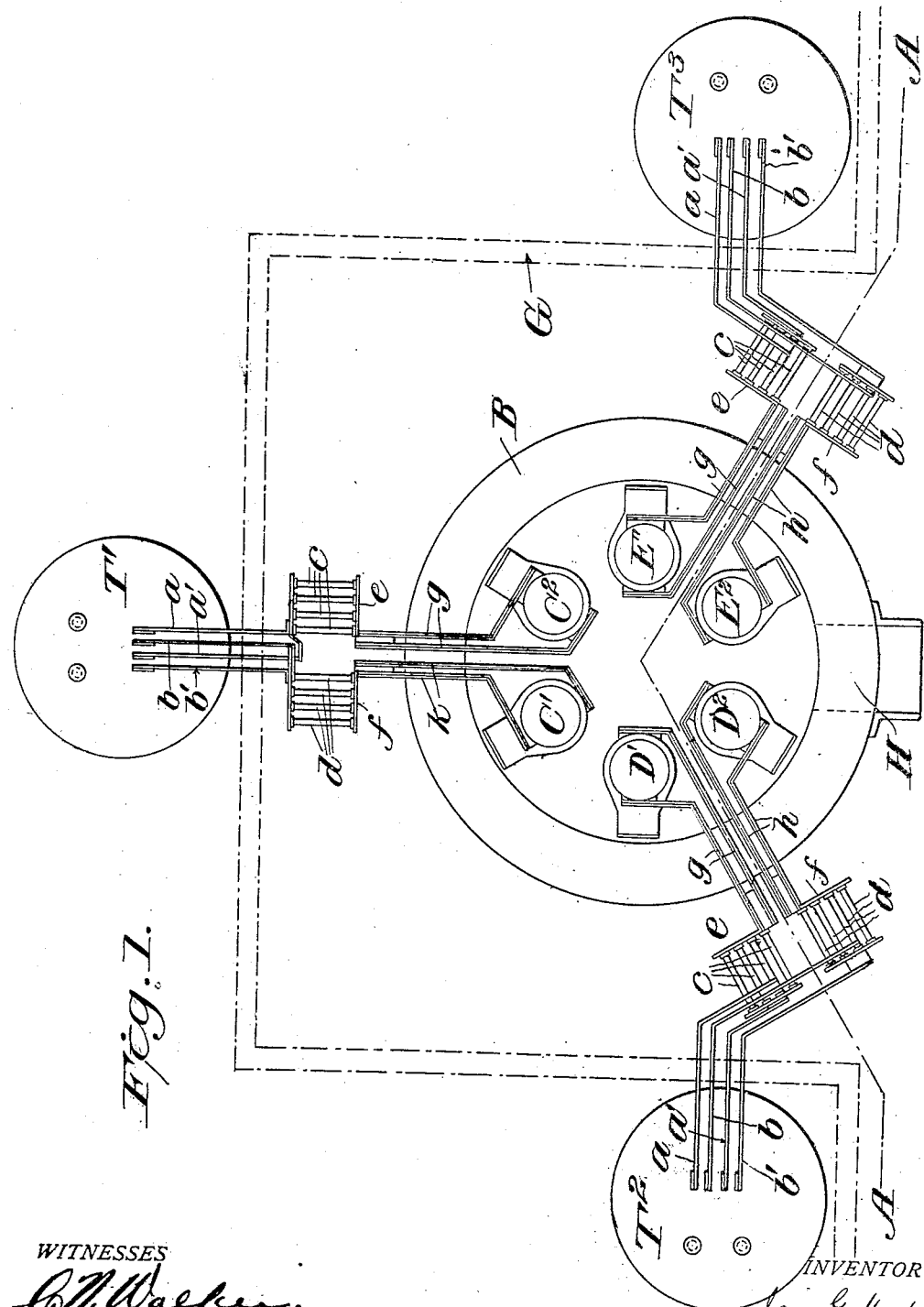

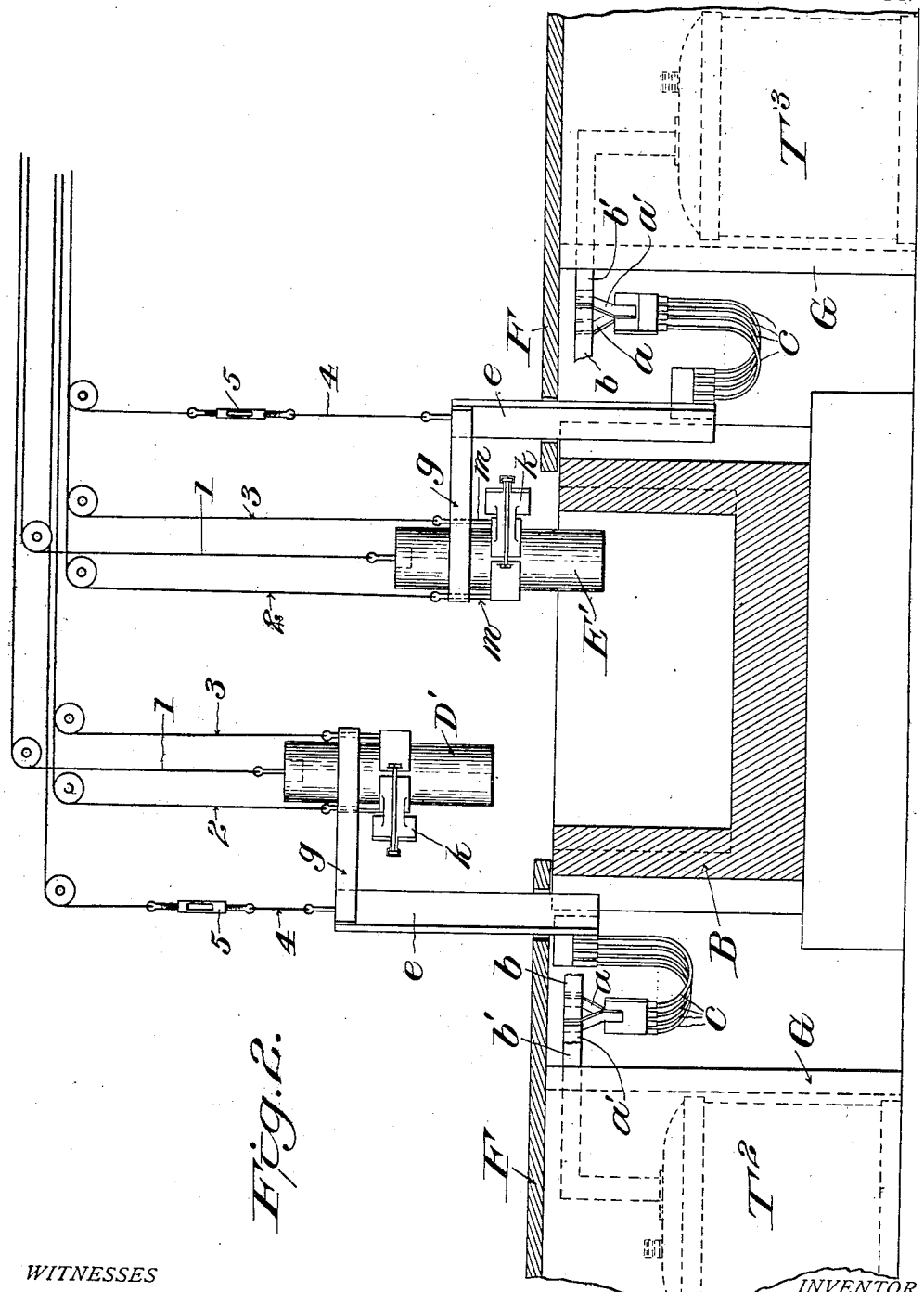

JAMES G. MARSHALL, OF NIAGARA FALLS, NEW YORK, ASSIGNOR TO UNION CARBIDE COMPANY, OF NIAGARA FALLS, NEW YORK, A CORPORATION OF VIRGINIA.

ELECTRIC FURNACE.

1,127,475.      Specification of Letters Patent.      Patented Feb. 9, 1915.

Application filed April 9, 1913. Serial No. 759,923.

*To all whom it may concern:*

Be it known that I, JAMES G. MARSHALL, a citizen of the United States, residing at Niagara Falls, in the county of Niagara and State of New York, have invented certain new and useful Improvements in Electric Furnaces, of which the following is a specification.

It is the object of this invention to provide an electric furnace with several independent heating units or foci, so related that each may be used separately or all or several of such units may be used together. Preferably these units are each composed of a pair of electrodes to which a single-phase current is supplied. When the current is obtained from alternating current transformers, it is important that the power factor shall be maintained as high as possible, and it is therefore a further object of the invention to so arrange the electrical connections that a high power factor shall be maintained, while at the same time providing that these connections shall be short and direct, in order that there may be no waste of current. These and other objects I attain by the arrangement shown in the accompanying drawings in which:

Figure 1 is a plan of the furnace; and Fig. 2 is an elevation on the irregular plane A—A of Fig. 1.

Referring to the drawing, B is the hearth of the electric furnace into which depend three sets of electrodes C′, C², D′ D², and E′ E². To each pair of these electrodes current is delivered by a separate transformer, T′, T², T³, respectively. In practice, it occurs that the quantity of current available varies, so that at times sufficient power for all three of the heating units or foci is not available, and the capability of use of less than the whole number of units is of advantage. As each transformer is separately connected to the power transmission system, any one may be disconnected without affecting the operation of the others.

The transformers are located under the charging floor F, and as close as possible to the furnace hearth. From each transformer, stationary outgoing and return conductors or bus-bars $a$, $a'$ and $b$, $b'$ pass through the wall G and are interlaced, as shown in Fig. 1, to maintain a high power factor. To these stationary bus-bars $a$, $a'$ and $b$, $b'$, are connected flexible copper cables $c$, $c$ and $d$, $d$, which in turn connect to vertically movable bus-bars $e$, $f$, extending upwardly through the floor and having rigidly secured to them conducting bars $g$, $g$, and $h$, $h$, leading to each electrode, as for example to E′, E². These bus-bars $g$, $g$, and $h$, $h$ are mounted as close to each other as possible and only branch away from each other as much as is necessary to allow of the springing on to the electrodes of the electrode clamps $k$, $k$, which may be of any suitable construction, but preferably that shown in my application Serial No. 740,871, filed January 8, 1913. Each jaw of the clamp is connected by means of a conducting support $m$ to one of the bars $g$.

Each electrode is provided with a cable 1, connected to suitable raising and lowering means. Cables 2 and 3 are similarly arranged to support the members of the contact clamp, and a cable 4, provided with an adjusting turn-buckle is connected to each of the movable bus-bars $e$.

H is the tap-hole of the furnace and is preferably located between two of the heating units.

It will be noted that, owing to the location of the transformers in close proximity to the base of the furnace, with upwardly-extending connections to the electrodes, these connections are short; and that the sets of conductors are arranged in close proximity and in fixed relation to each other so that a high power factor is maintained. At the same time, the space above the furnace hearth is kept free for the suspension-apparatus.

My whole furnace constitutes an arrangement by means of which the power, whether sufficient for the whole furnace or only for a part thereof, can be efficiently used. The heat generated at each pair of electrodes effectively maintains the full working temperature within a certain area of the furnace, the area of the hearth being so proportioned that when all the electrodes are in use, the whole mass of material in the furnace is kept molten. If however, the power supply should decrease, any one of the transformers can be cut out, and the remaining pairs or pair of electrodes still kept in operation and each working at full efficiency within its own area. Thus, when the power is reduced to an extent sufficient to necessitate the cutting out of one set of electrodes, while the active area of the furnace is reduced, the remaining electrodes, operating at practically the same efficiency as before, keep the thus reduced area of the furnace hearth in active operation at the full working temperature.

I claim:

1. In an electric furnace, a hearth, electrodes extending downwardly into said hearth, means for suspending said electrodes, an alternating-current transformer adjacent the base of the hearth, and non-inductively interlaced conductors extending upwardly from said transformer and connected to said electrodes.

2. In an electric furnace, a hearth, electrodes extending downwardly into said hearth, means for suspending said electrodes, an alternating-current transformer adjacent the base of the hearth, and non-inductively interlaced conductors extending upwardly from said transformers and connected to said electrodes, these electrical connections comprising stationary portions extending from the transformer toward the hearth, vertically movable portions connected to the electrodes and flexible portions connecting the stationary and movable portions.

3. In an electric furnace, the combination with a hearth, of two electrodes arranged side by side and extending downwardly into said hearth, a pair of closely associated movable conductors connected to each electrode, the two pairs of conductors arranged in close proximity and in non-inductive relation to each other, a transformer adjacent to the lower portion of said furnace, multiple and interlaced conductors connecting the transformer to said movable conductors and means for adjustably supporting said electrodes.

4. In an electric furnace, the combination with a hearth, of a pair of electrodes arranged side by side in close proximity and extending downwardly into said hearth, a jaw-clamp surrounding each electrode, two pairs of closely associated movable conductors, the conductors constituting one pair connected respectively to the jaws of one electrode-clamp, the conductors constituting the other pair connected respectively to the jaws of the other electrode-clamp, and the two pairs of conductors being arranged in close proximity and in non-inductive relation to each other, a transformer adjacent to the lower portion of said furnace, multiple and interlaced conductors connecting the transformer to said movable conductors and means for adjustably supporting said electrodes.

5. In an electric furnace, a pair of closely associated electrodes, and means for supplying alternating current thereto, comprising pairs of conductors, clamped one pair to each electrode, the pairs of conductors arranged in non-inductive relation to each other, one member of each pair extending between the electrodes, and these two members being arranged in non-inductive relation to each other.

6. In an electric furnace, a pair of suspended closely associated electrodes, and means for supplying alternating current thereto, comprising pairs of horizontally arranged conductor bars, clamped one pair to each electrode, downwardly extending conductor bars secured to said horizontal bars, a transformer and bus-bars located adjacent the base of the furnace, and cables connecting the bus-bars and downwardly extending bars, said conductor bars, cables, and bus-bars arranged in non-inductive relation.

7. In an electric furnace, the combination with a hearth, of a plurality of heating foci each consisting of a pair of electrodes depending into said hearth, conductor bars in sets adjustably clamped to each of said electrodes in proximity to the top of the hearth, transformers, one for each pair of electrodes, located in proximity to the base of the hearth, and downwardly extending connections from said bars to said transformer, said bars and connections being arranged in non-inductive relation to each other, whereby any one or all of said heating foci may be used and a high power factor is maintained.

In testimony whereof I affix my signature in presence of two witnesses.

JAMES G. MARSHALL.

Witnesses:
T. L. SECORD,
SIDNEY OTIS.

Copies of this patent may be obtained for five cents each, by addressing the "Commissioner of Patents, Washington, D. C."